United States Patent [19]

Heard

[11] 3,894,707

[45] July 15, 1975

[54] MOUNTING DEVICES

[76] Inventor: Robert Arthur Henderson Heard, Church Farm Church Ln., Backwell, England

[22] Filed: Feb. 26, 1973

[21] Appl. No.: 335,507

[30] Foreign Application Priority Data
Feb. 29, 1972 United Kingdom............... 9310/72
Aug. 23, 1972 United Kingdom............. 39298/72

[52] U.S. Cl. .................. 248/231; 248/73; 248/223
[51] Int. Cl.² ........................................... E01F 9/01
[58] Field of Search ....... 248/73, 62, 231, 221, 228, 248/72, 223, 70, 361 A, 74 R, 225, 361 R, 230, 60, 302, 307, 74 B; 24/243 SC, 265 CD, 221 R, 265 R, 265 A; 105/369 A; 40/125 H; 52/38

[56] References Cited
UNITED STATES PATENTS

| 519,312 | 5/1894 | Arthur | 248/231 |
|---|---|---|---|
| 1,641,559 | 9/1927 | Thompson | 248/231 |
| 1,648,220 | 11/1927 | Gerow et al. | 248/231 X |
| 1,760,458 | 5/1930 | Weber | 248/74 R |
| 2,084,816 | 6/1937 | Littlefield | 40/125 H |
| 2,113,180 | 4/1938 | Klein | 248/230 |
| 2,474,920 | 7/1949 | Stearns | 248/361 A X |
| 2,550,001 | 4/1951 | Button | 248/70 X |
| 2,720,016 | 10/1955 | Johannsen | 248/231 X |
| 2,802,524 | 8/1957 | Peacock | 248/231 X |
| 2,931,471 | 4/1960 | Howard | 24/221 R X |
| 3,226,069 | 12/1965 | Clarke | 248/73 |
| 3,241,800 | 3/1966 | Richter | 248/231 |
| 3,254,866 | 6/1966 | Hamrick | 248/74 B |
| 3,290,743 | 12/1966 | Hanson | 248/361 A X |
| 3,321,220 | 5/1967 | Buckman | 24/279 X |
| 3,363,865 | 1/1968 | Metsker | 248/71 |
| 3,486,726 | 12/1969 | Kindorf et al. | 248/72 |
| 3,602,473 | 8/1971 | Van Riet et al. | 248/317 |

FOREIGN PATENTS OR APPLICATIONS

| 129,017 | 8/1950 | Sweden | 248/361 B |

Primary Examiner—Roy D. Frazier
Assistant Examiner—Rodney H. Bonck

[57] ABSTRACT

An improved T-ended attachment element for connection with a channel having a mouth restricted by inturned lips. The head of the T having a pair of rigid ears extending in opposite directions. The head with its ears can still be inserted through the restricted mouth of the channel, and when turned across the channel the ears extend lengthwise under the inturned lips and provide an increased bearing surface.

8 Claims, 6 Drawing Figures 3,894,707

MOUNTING DEVICES

BACKGROUND OF THE INVENTION

This invention relates to mounting devices, and is especially applicable to devices for mounting to a supporting post a channel-bearing member, such as a sign, in which the channel has a mouth restricted by inturned lips.

A relatively recent development in the manufacture of large signs, particularly road signs, is to build up the sign from a number of planks. One surface of each plank bears part of the indicia, and when the planks are assembled edge-to-edge in the correct relationship, the combined indicia make up the total sign. A disadvantage, however, is that plank signs tend to require a large number of fittings, since usually each plank has to be individually attached to the supporting post or posts. It is therefore desirable that such fittings be as inexpensive as possible. Also, it has become common practice to manufacture the planks from extruded aluminium, and to form them with one or more rearwardly opening longitudinally extending channels on their rear surface, the mouth of each channel being restricted by inturned lips. These channels are used to mount the planks to the post by means of a rigid band which extends around the post and is connected at its ends to the channel. The end of the band may be adjustably connected to the channel by means of a nut and bolt assembly, the head of the bolt being trapped within the channel by the inturned lips and the shank of the bolt projecting from the channel and passing through an aperture in a flange formed at the end of the strap, and retained by the nut which can be used to tighten the strap around the post. Another method of attachment to the channel is to form a T-shaped toggle end to the band which can be inserted lengthwise through the mouth of the channel and then turned to lie across the channel so that the head of the T engages under the inturned lips and cannot be withdrawn.

The nut and bolt arrangement is inconvenient to apply since the bolt has to be slid along the channel from one end, and also it is more complicated and more expensive to manufacture, particularly from stainless steel, and for both these reasons its use should be kept to a minimum. The toggle end type of attachment is convenient to use and inexpensive to manufacture, but has the disadvantage that when the band is tightened around the post the flat head of the toggle can cut through the soft aluminium lips, and cause failure of the attachment. Making the band of thicker material does not satisfactorily solve this problem, and also introduces an unnecessary materials cost, particularly where the fixing is to be made from stainless steel.

SUMMARY OF THE INVENTION

The invention provides a modified toggle end in which the head is provided with a pair of flat ears extending parallel to each other in opposite directions out of the plane of the head, preferably at right angles thereto. It has been found that quite long ears can be provided while still allowing the entire head and ears to be introduced through the restricted mouth of the channel. Once inside, the toggle is turned so that the ears extend lengthwise of the channel under the inturned lips. By this means, the toggle can be made of relatively thin sheet metal, such as stainless steel, and yet have an extensive area bearing against the underside of the lips of the channel. It has been found that this attachment can withstand a considerable force without undue distortion of the aluminium lips.

Not only can the band be attached to the channel by an attachment member of thin sheet metal, but also the band itself, instead of being rigid, can be a strap of flexible high tensile material, such as stainless steel or even plastics material such as fibrillated polypropylene. A stainless steel strap can be used which is sufficiently flexible to conform to the shape of the post, and yet can be formed with permanently cranked ends which engage in slots in the attachment members and will be secure against any force likely to be met in practice.

These and other features of the invention will become apparent from the following description of various preferred embodiments.

DESCRIPTION OF THE PREFERRED EMBODIMENTS

Figure 1:
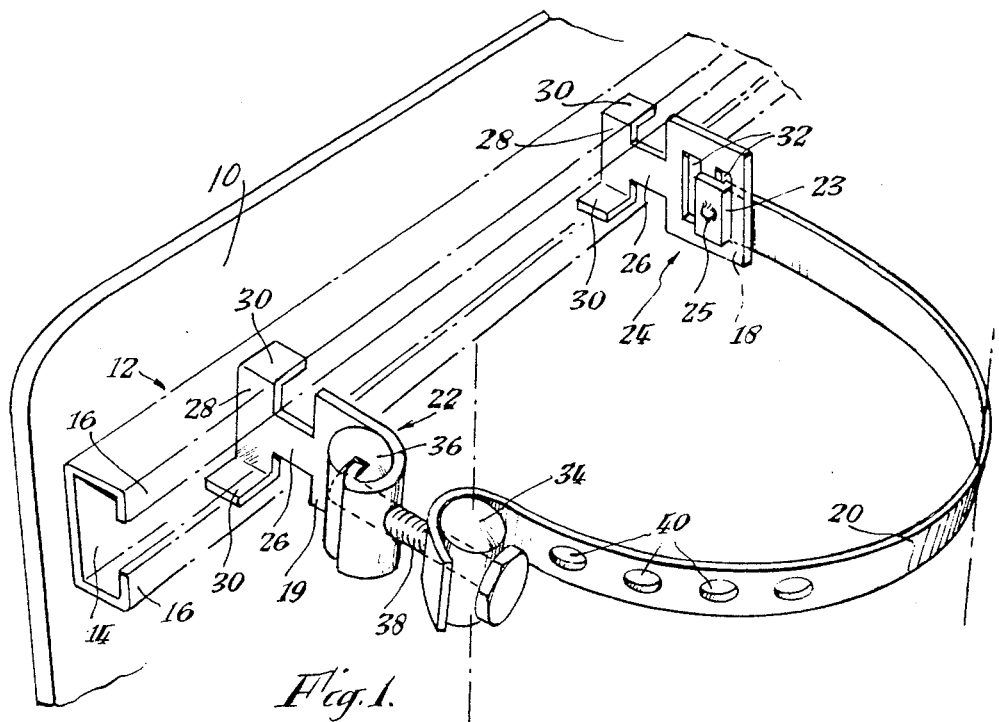
FIG. 1 shows a perspective view, partly exploded, of a first embodiment of mounting device.
Figure 2:
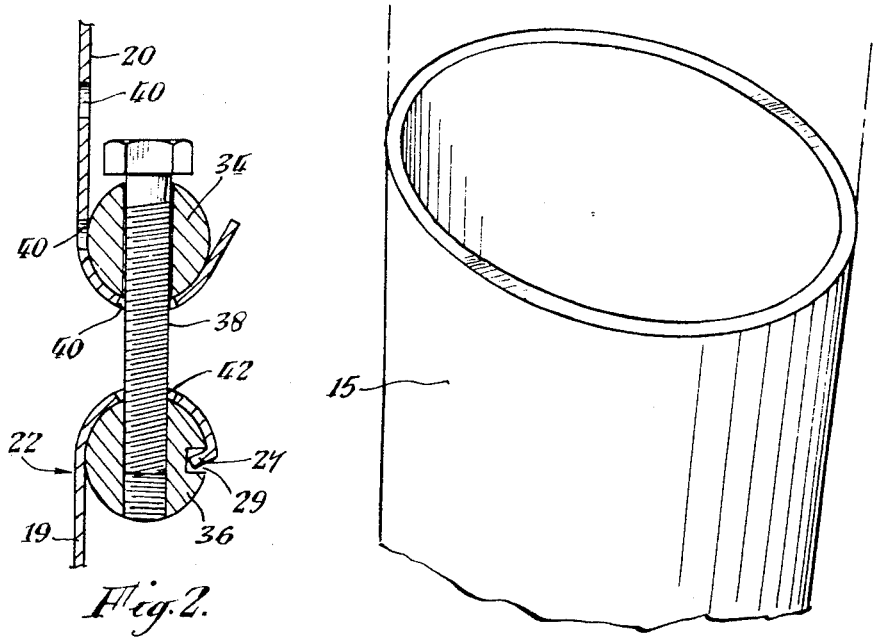
FIG. 2 shows a cross-section through the adjustable part of the device of FIG. 1.
Figure 3:
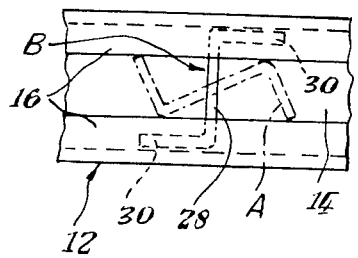
FIG. 3 shows the mouth of the channel with the two principal positions of the toggle end of the attachment member indicated.

Referring firstly to FIGS. 1 to 3; the panel 10 of a sign has secured to or formed integrally with its rear surface a channel member 12 having a rearwardly directed mouth 14 with inturned lips 16 which constrict the mouth. The sign is to be mounted to a circular section post 15 by a mounting device which comprises a flexible strap 20 of stainless steel which passes around the post and is attached at its ends to the channel 12 by means of toggle-shaped attachment members 22, 24 respectively.

Each attachment member is made from flat stainless steel sheet and has a constricted neck 26 carrying an enlarged head 28 at the sides of which are oppositely projecting ears 30. This toggle-end is adapted to pass through the restricted mouth 14 of the channel 12 when at a suitable angle thereto, as indicated by position A in FIG. 3, and on subsequently turning the attachment member so that the head 28 lies transversely across the channel, as indicated by position B in FIG. 3, the ears 30 engage under the lips 16 and prevent its withdrawal. It should be noted that the head and ears are quite rigid, and no distortion of any kind is required to insert them through the mouth of the channel.

The strap 20 is connected to the attachment member 24 by forming a permanent crank 23 in the end of the strap, which engages in a slot 32 in the body 18 of the attachment member, the sheet material of the strap being sufficiently thick to permanently retain the cranked shape. Two alternative slots 32 are provided, if desired, to give a degree of adjustment. Raised pips 25 (only one of which is shown in FIG. 1) can be formed in the strap above and below the bend of the crank so as to retain the attachment member to the strap prior to use. If the strap is sufficiently flexible, the pipped end can be forcibly withdrawn through the slot 32 if this should prove necessary.

The other end of the strap is adjustably connected to the other attachment member 22. Two cylindrical blocks 34, 36 of rigid material, for example aluminium, have central passages passing diametrically through them. The passage in the block 34 freely receives the screw-threaded shank of a bolt 38. The end of the strap 20 is bent around the cylindrical surface of the block 34, and has an aperture 40 through which the shank of the bolt 38 also freely passes. The body 19 of the attachment member 22 is bent around the cylindrical surface of the block 36, and has an aperture 42 to likewise freely receive the shank of the bolt 38. The passage in the block 36, however, is internally screw-threaded to mate with the thread of the bolt 38, and in this way the bolt adjustably connects the attachment member 22 to the strap 20. The end of the turned over portion of the attachment member 22 can if desired be bent inwardly at 27 to engage in a slot 29 in the block 36, thus holding the block captive. If desired, a number of additional apertures 40 are provided in the strap 20 for alternative engagement with the shank of the bolt 38, according to the size of the post 18.

The principal advantage of this type of adjustable connection is that the strap 20 can be of completely flexible material, so long as it has sufficient tensile strength. It need not be stainless steel, but could for example be made of fibrillated polypropylene or some other high tensile material. In the case of extreme flexibility of this latter kind, the connection to the other attachment member 24 will obviously have to be different from that shown above, and could for example be as described below with reference to FIG. 6. The attachment member 22 needs to be sufficiently rigid to be retained in the channel 12, but the rigidity or otherwise of the apertured body of the attachment member is irrelevant so long as the material has sufficient tensile strength. It will be apparent, from a consideration of FIG. 2, that the only forces on the attachment member 22 and the strap 20 in the region of interconnection are tensile forces resulting from the engagement of the bolt in the respective apertures. The provision of alternative apertures in the strap 20 means that the same fitting can be used for posts of widely differing sizes, and this adjustment can be made by unskilled labour on site, merely by engagement of the shank of the bolt 38 projecting from the block 34 in the appropriate aperture, followed by bending of the end of the strap around the block 34 if it is not freely flexible, and if desired subsequent cutting off of the excess length of strap. The bolt itself provides the final tightening of the strap around the post, and the alternative positions of engagement of the strap with the other attachment member 24 can provide adjustment settings intermediate the spacings of the holes 40. The mounting device is particularly suitable for non-standard sizes of posts and for posts of tapering section.

Figure 4:
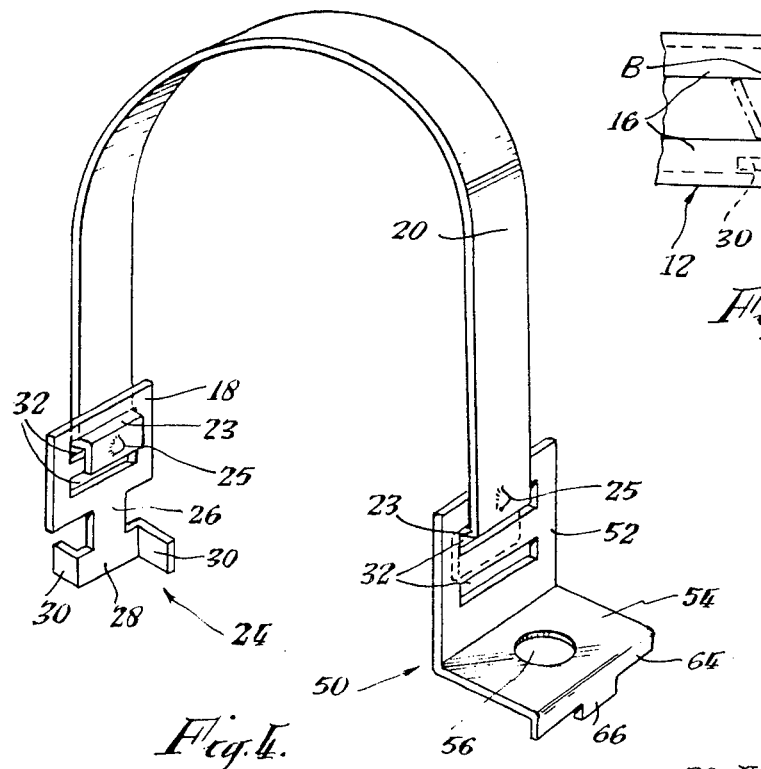
FIG. 4 shows a perspective view of a second embodiment of mounting device.
Figure 5:
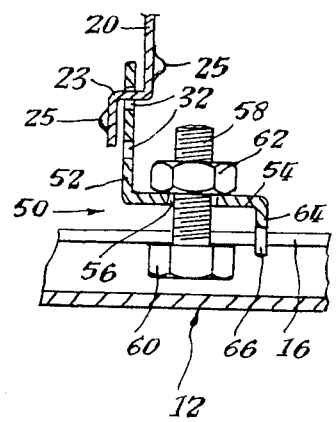
FIG. 5 shows a cross-section through the adjustable end of the device of FIG. 4.

FIGS. 4 and 5 show a similar mounting device, except that the manner of adjustable connection of one end of the strap to the channel is different. An attachment member 50 is made from flat stainless steel sheet and is of generally L-shape. One limb 52 has similar apertures 32 to receive the cranked end of the strap 20. The other limb 54 has an aperture 56 to receive the shank 58 of a bolt, the head 60 of which is slidably located within the channel 12 and retained by the inturned lips 16. The attachment member 50 is retained on the bolt by a nut 62. The free end of the limb 54 has a downturned rib 64 which bears upon the top of the channel on either side of the mouth, as shown in FIG. 5, and a lug 66 is formed as an extension of this rib to locate in the mouth of the channel. This arrangement provides a fulcrum for the adjustment movement of the attachment member 50, and increases its efficiency, stability and strength. Adjustment is effected simply by rotation of the nut 62.

Figure 6:
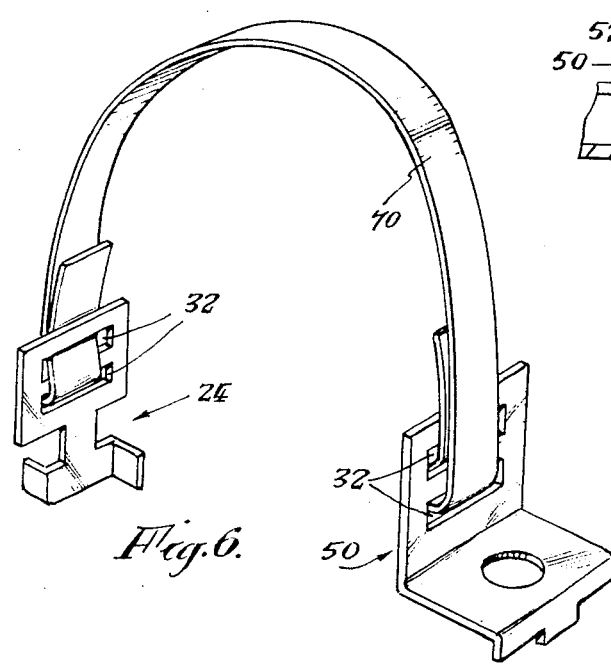
FIG. 6 shows a perspective view of a third embodiment of mounting device.

Referring now to FIG. 6; the attachment members 24 and 50 are used, as in the previous embodiments, but in this case a more flexible strap 70 is shown. The ends of this strap are threaded through the two slots 32 in each of the attachment members. When the device is tightened, the looped ends of the straps are held securely.

Consideration of the geometry of the toggle-end of the present invention will show that, in general, the perpendicular distance of the corner between the head and one ear and a notional line joining the free end of that ear and the corner between the head and the other ear will be slightly less than the width of the restricted mouth of the channel. This will therefore usually be about the same as or rather less than the width of the neck of the element considered in the direction at right angles to the ears.

I claim:

1. A device for mounting a channel-shaped bearing member to a support post, the channel having a mouth restricted by a pair of inturned lips, said device comprising in combination a single strap adapted for passing around a post and terminating at at least one end portion thereof in a permanently cranked section, at least one toggle ended attachment member formed with slot means for receiving within said slot the bend of the crank to thereby provide a firm connection between said one end portion of the strap and said attachment member, the toggle end of the attachment member comprising (a) a flat head joined to a body of the attachment member through a narrower neck and (b) a pair of flat ears rigid with the head and extending parallel to each other in opposite directions out of the plane of the head, the ears and the narrower neck being dimensioned to permit introduction of the head, in a predetermined orientation thereof, through the restricted mouth of the channel and for turning movement of the head for the head to lie in an operative position transversely to the length of the channel with the ears engaging edgewise the inturned lips of the channel and extending longitudinally of the channel whereby to retain said head and said rigid ears within said channel, and a further attachment member carried by an end portion of said single strap opposite said one end portion and adapted for adjustably connecting said opposite end of the strap to said channel at a location longitudinally spaced from the region of effective connection of said one end portion of the strap to said channel, said further attachment member being L-shaped thereby providing two limbs, one limb being adapted for connection to the end of the strap and the other limb which extends from said one limb being apertured to receive a nut and bolt assembly, whereby the head of the bolt may be located within the channel and retained by the inturned lips and the resulting attachment of the strap to the channel adjusted by means of the nut.

2. A device for mounting a channel-shaped bearing member to a support post, the channel having a mouth restricted by a pair of inturned lips, said device comprising in combination a single flexible strap adapted for passing around a post and terminating at at least one end portion thereof in a permanently cranked section, at least one toggle ended attachment member formed with slot means for receiving within said slot the bend of the crank to thereby provide a firm connection between said one end portion of the strap and said attachment member, the toggle end of the attachment member comprising (a) a flat head joined to a body of the attachment member through a narrower neck and (b) a pair of flat ears rigid with the head and extending parallel to each other in opposite directions out of the plane of the head, said ears having an extent and said head a width greater than said channel mouth, and to permit entry of said head and said ears through said channel mouth for attachment of the toggle element to the channel member, the perpendicular distance of the corner between the head and the ear and a notional line joining the free end of that ear and the corner between the head and the other ear is maintained less than the width of said channel mouth, and a further attachment member carried by an end portion of said single strap opposite said one end portion and adapted for adjustably connecting said opposite end of the strap to said channel at a location longitudinally spaced from the region of effective connection of said one end portion of the strap to said channel, said further attachment member being L-shaped thereby providing two limbs, one limb being adapted for connection to the end of the strap and the other which extends from said one limb being apertured to receive a nut and bolt assembly, whereby the head of the bolt may be located within the channel and retained by the inturned lips and the resulting attachment of the strap to the channel adjusted by means of the nut.

3. A device according to claim 1, wherein said strap is of stainless steel.

4. A device according to claim 2, wherein said flexible strap is of stainless steel.

5. A mounting device according to claim 1, wherein said other limb extending from said one limb has a down-turned rib at its free end, adapted to bear upon the channel at each side of its mouth and providing a fulcrum for the adjustment movement of the attachment member.

6. A device according to claim 2, wherein said other limb extending from said one limb has a downturned rib at its free end, adapted to bear upon the channel at each side of its mouth and providing a fulcrum for the adjustment movement of the attachment member.

7. A device according to claim 1, wherein said strap and terminating attachments are preassembled as a unitary structure for use at on-site installations.

8. A device according to claim 2, wherein said strap and terminating attachments are preassembled as a unitary structure for use at on-site installations.

* * * * *